United States Patent Office 3,463,819
Patented Aug. 26, 1969

3,463,819
GLYCOL PRODUCTION
Curtis W. Smith, Old Greenwich, Conn., and Gerhard N. Schrauzer, Orinda, Richard J. Windgassen, Oakland, and Kenneth F. Koetitz, Pleasant Hill, Calif., assignors to Shell Oil Company, New York, N.Y., a corporation of Delaware
No Drawing. Filed Oct. 21, 1965, Ser. No. 500,296
Int. Cl. C07c 47/18
U.S. Cl. 260—602                                   8 Claims

ABSTRACT OF THE DISCLOSURE

Reaction of lower alkyl epoxides with carbon monoxide and hydrogen in the presence of certain phosphine-modified cobalt carbonyl catalysts results in production of 1,3-glycols and β-hydroxyaldehyde.

---

This invention relates to an improved process for the production of 1,3-glycol and β-hydroxyaldehyde by hydroformylation of epoxides.

It is known that epoxide compounds, i.e., oxirane compounds, are reactive under hydroformylation conditions. Niederhauser, U.S. 3,130,233 issued April 21, 1964, discloses a process for reacting a variety of epoxide compounds with carbon monoxide and hydrogen in the presence of certain Group VIII metal catalysts. Although this process, in some instances, results in the production of a β-hydroxyaldehyde product, when an epoxide reactant of a relatively simple structure was employed the sole product was an α,β-unsaturated aldehyde. For example, hydroformylation of ethlyene oxide and propylene oxide afforded acrolein and crotonaldehyde respectively. A similar process is disclosed by Yokokawa et al., Bull. Chem. Soc. Japan, 37, 677 (1964), wherein propylene oxide is converted to a mixture of products containing β-hydroxybutyraldehyde. Under similar conditions, reaction of ethylene oxide gave acrolein as the product.

It is an object of the present invention to provide an improved process for the hydroformylation of epoxides. More particularly, it is an object to provide an epoxide hydroformylation process wherein 1,3-glycol and β-hydroxyaldehyde are observed as product when epoxides are reacted with carbon monoxide and hydrogen under oxo conditions. A specific object is to provide a process for the production of trimethylene glycol from ethylene oxide.

It has now been found that these objects are accomplished by the process of contacting certain lower alkyl epoxides with carbon monoxide and molecular hydrogen in liquid phase solution in the presence of certain phosphine-modified cobalt carbonyl catalysts. The process of the invention is characterized by the formation of a mixture of hydroxyl-containing products, particularly a mixture of substantial proportions of 1,3-glycol together with lesser proportions of β-hydroxyaldehyde.

The epoxide reactant of the present process comprises an organic compound, two carbons of which are connected by an oxy linkage as well as by a carbon-carbon single bond. Although epoxide reactants of varying structure are suitably employed in the present process, the preferred epoxide reactants are saturated hydrocarbon vicinal epoxides of up to 10 carbon atoms. Such materials, alternatively termed epoxyalkanes, are suitably cyclic or acyclic and are of a straight-chain or of a branched structure. Acyclic epoxides are herein considered to be those epoxides wherein the carbon atoms of the epoxide moiety are not also members of a carbocyclic ring, for example, epoxides such as ethylene oxide, propylene oxide, isobutylene oxide, 1,2 - epoxypentane, 1,2-epoxy-4-methylpentane, 1,2-epoxyoctane, 3-cyclohexyl-1,2-epoxypropane, 3,4-epoxynonane, 1,2-epoxy-2,2,4-trimethylhexane and 1,2-epoxydecane. Cyclic epoxides are herein considered to be those epoxides wherein the carbon atoms of the epoxy moiety are also members of a carbocyclic ring. Illustrative epoxycycloalkanes include cyclohexene oxide, cyclopentene oxide, cyclooctene oxide, 1,2-epoxy-4-methylcyclohexane, 4,5-dimethyl-1,2-epoxycyclohexane, 2,3-epoxy-decahydronaphthalene and 1,2-epoxy-4-propylcyclohexane.

In general, utilization of acyclic epoxides is preferred over the use of analogous cyclic epoxide reactants, particularly when an acyclic epoxide of up to 6 carbon atoms is employed wherein the epoxy linkage is terminal, i.e., the epoxide is an acyclic 1,2-epoxyalkane. In part because of the desirable products obtained therefrom, ethylene oxide is especially preferred as the epoxy reactant.

The catalysts employed in the process of the invention are phosphine-modified cobalt carbonyl complexes, particularly dicobalt hexacarbonyl complexes wherein the remaining two coordination numbers of the cobalt moieties are complexed with one or more tertiary phosphine ligands. The class of preferred complexes is therefore characterized by the presence within the complex of three molecules of carbon monoxide and one tertiary phosphine moiety for each atom of cobalt. As is discussed in greater detail hereinbelow, the tertiary phosphine complexing ligand portion of the catalyst complex comprises a mono- to di-phosphine wherein each phosphorus is completely substituted with organic substituents attached to the phosphorus by carbon-phosphorus bonds, and at least one substituent of each phosphorus is an aliphatic substituent.

In one modfication of the process of the invention, the tertiary phosphine stabilizing ligand is a monodentate ligand, that is, the stabilizing ligand is a tertiary phosphine of a single phosphorus atom as the sole complexing site in the tertiary phosphine ligand. This class of tertiary phosphines, herein termed mono-phosphines, is generically classified as tertiary mono-phosphine of from 3 to 36 carbon atoms wherein at least one phosphorus substituent is aliphatic and each prosphorus substituent is a hydrocarbon substituent, i.e., contains only atoms of carbon and hydrogen, and is free from aliphatic unsaturation. A preferred class of tertiary mono-phosphines is represented by the formula $$RRRP$$

wherein R independently is monovalent hydrocarbon of up to 20 carbon atoms, preferably up to 12, and is free from aliphatic unsaturation, with the proviso that two R may together form a divalent hydrocarbon moiety of up to 12 carbon atoms. Of course, at least one phosphorus substituent is aliphatic as is previously stated. The group R, when monovalent, is therefore alkyl, cycloalkyl or aryl of up to 12 carbon atoms, preferably of up to 6 carbon atoms, and is illustrated by alkyl R groups such as methyl, ethyl, butyl, isobutyl, 2-ethylhexyl, octyl, benzyl, β-phenylethyl and dodecyl; by cycloalkyl R groups such as cyclopentyl, cyclohexyl, cyclooctyl, 2,3-diethylcyclopentyl, 4-butylcyclohexyl, 2,4,5-trimethylcyclohexyl and 3-butylcyclooctyl; and by aryl R groups such as phenyl, tolyl, xylyl, o-phenylphenyl, p-tert-butylphenyl, 2,4-diethylphenyl and m-cyclohexylphenyl.

The whole aliphatic phosphines comprise a particularly suitable class of tertiary mono-phosphines, especially when each R is a straight-chain primary alkyl group, e.g., tri-n-butylphosphine. An additional class of particularly preferred tertiary mono-phosphines comprises the class wherein two R groups together form a divalent hydrocarbon moiety. Such cyclophosphines are illustrated by 1-ethylphospholidine, 1-phenylphospholidine, 1-phenylphosphorinane, 1-butyl-phosphorinane, 4,4-dimethyl-1-phenylphosphorinane, 1-phenylphosphepane, 1-ethylphosphepane, 3,6-dimethyl-1-phenylphosphepane, 9-phenyl-9-phosphabicyclo(4.2.1)nonane, 9-phenyl - 9 - phosphabicyclo (3.3.1)nonane and 9-butyl-9-phosphabicyclo(4.2.1)nonane.

In the modification where the phosphine portion of the phosphine-modified cobalt carbonyl complex is monophosphine, the catalyst comprises two atoms of cobalt, six molecules of carbon monoxide and two molecules of tertiary mono-phosphine. Such materials are represented by the formula $$(RRRP)_2Co_2(CO)_6$$

wherein R has the previously stated significance and at least one substituent of each phosphorus is aliphatic.

In an alternate modification of the phosphine-modified cobalt complexes of the invention, the tertiary phosphine employed is a bidentate ligand, i.e., the phosphine ligand is a tertiary di-phosphine. Preferred tertiary di-phosphine ligands are represented by the formula $$RRP\!-\!R'\!-\!PRR$$

wherein R has the previously stated significance, and R' is a divalent, saturated, hydrocarbon aliphatic moiety, preferably $a,\omega$-alkylene of from 2 to 3 carbon atoms. Illustrative di-phosphines of this class include 1,2-bis(diphenylphosphino)ethane, 1,2 - bis(dibutylphosphino) ethane, 1,3-bis(dimethylphosphino)propane, 1,2 - bis(dihexylphosphino)propane, 1,2 - bis(ditolylphosphino)ethane, 1,3-bis(phenylpropylphosphino)propane, 1-(dibutylphosphino)-3-(diphenylphosphino)propane and 1-(dioctylphosphino) - 2 - (dibutylphosphino)propane. In this modification of the cobalt complex of the invention wherein tertiary di-phosphine is employed, the catalyst is represented by the formula $$(RRP\!-\!R'\!-\!PRR)Co_2(CO)_6$$

wherein R and R' have the previously stated significance.

Generically, the phosphine-modified cobalt complexes are characterized as dicobalt hexacarbonyl complexes of additionally present tertiary mono- to di-phosphine ligand sufficient to provide one phosphorus complexing moiety for each atom of cobalt present within the complex molecule. These complexes are represented by the general formula

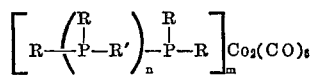

wherein R and R' have the previously stated significance with at least one substituent of each phosphorus being aliphatic, n is a whole number from 0 to 1 inclusive and m is a whole number from 1 to 2 inclusive selected so that the sum of m and n, i.e., the term (m+n), equals 2.

The optimum ratio of epoxide to phosphine-modified cobalt carbonyl complex will in part depend upon the particular epoxide and cobalt complex employed. However, molar ratios of epoxide to cobalt complex from about 2:1 to about 100:1 are generally satisfactory, with molar ratios of from about 4:1 to about 15:1 being preferred. In one modification, the phosphine-modified cobalt carbonyl complex is employed as a preformed material, being prepared as by reaction of a cobalt salt with carbon monoxide and hydrogen in the presence of the tertiary phosphine ligand, then isolated and subsequently utilized in the present process. In an alternate modification, the phosphine-modified cobalt complex is prepared in situ as by addition to the reaction mixture of a cobalt salt or cobalt octacarbonyl together with the tertiary phosphine ligand whose introduction into the catalyst complex is desired. For example, introduction to the reaction medium of a mixture of dicobalt octacarbonyl and tributylphosphine serves to form a complex equivalent to bis(tributylphosphine)dicobalt hexacarbonyl.

In practice, it is on occasion desirable to employ the phosphine-modified cobalt complex in conjunction with a minor proportion of excess tertiary phosphine ligand which is the same as or is different from the phosphine ligand(s) of the cobalt complex. Although the role of the excess phosphine is not known with certainty, the presence thereof in the reaction system appears to promote or otherwise modify catalyst activity. Although excess phosphine is not required, when excess phosphine is utilized amounts up to about 0.2 mole per mole of cobalt complex are satisfactory.

The process of the invention is conducted in liquid-phase solution in an inert solvent. Although a variety of solvents which are inert to the reactants and catalyst and which are liquid at reaction temperature and pressure are in part operable, in order to obtain a maximum yield of glycol it is preferred to employ a non-hydroxylic, substantially anhydrous solvent which is free from aliphatic carbon-carbon unsaturation and contains no atoms other than carbon, hydrogen and oxygen. Thus, certain classes of oxygenated hydrocarbon solvents such as phenols, carboxylic acids and aldehydes are not suitably employed in the present process. Illustrative of suitable solvents are hydrocarbons, particularly aromatic hydrocarbons of up to 10 carbon atoms such as benzene, toluene, xylene, ethylbenzene, and butylbenzene; ketones, particularly wholly aliphatic ketones, i.e., alkanones, of up to 10 carbon atoms such as acetone, methyl ethyl ketone, methyl isobutyl ketone, ethyl hexyl ketone and dibutyl ketone: esters of up to 10 carbon atoms, particularly lower alkyl esters of carboxylic acids which are aliphatic or aromatic carboxylic acids having one or more carboxyl groups, preferably from 1 to 2, such as ethyl acetate, methyl propionate, propyl butyrate, methyl benzoate, diethyl glutarate, diethyl phthalate and dimethyl terephthalate; and ethers of up to 10 carbon atoms and up to 4 ether oxygen atoms, which ethers are cyclic or acylic ethers and which are preferably wholly aliphatic ethers, e.g., diethyl ether, diisopropyl ether, dibutyl ether, ethyl hexyl ether, methyl octyl ether, dimethoxyethane, diethylene glycol dimethyl ether, diethylene glycol diethyl ether, glycerol trimethyl ether, 1,2,6-trimethoxyhexane, tetradhydrofuran, 1,4-dioxane, 1,3-dioxane, 1,3-dioxolane and 2,4-dimethyl-1,3-dioxane. In most applications the ethers comprise the preferred reaction solvents, particularly dialkyl esters of from 4 to 8 carbon atoms such as diethyl ether and diisopropyl ether.

The amount of solvent to be employed is not critical. Typical molar ratios of reaction solvent to epoxide reactant vary from about 5:1 to about 150:1.

The process of the invention comprises contacting the epoxide reactant and catalyst with carbon monoxide and molecular hydrogen. The molar ratio of carbon monoxide to hydrogen most suitably employed is from about 4:1 to about 1:6, with best results being obtained when ratios of from about 1:1 to about 1:3 are utilized. No special precautions need to be taken with regard to the carbon monoxide and hydrogen and commercial grades of these reactants are satisfactory. The carbon monoxide and hydrogen are suitably employed as separate materials although it is frequently advantageous to employ commercial mixtures of these materials, e.g., synthesis gas.

The process is conducted, in one modification, by charging the epoxide reactant, catalyst and reaction solvent to an autoclave or similar pressure reactor and introducing the hydrogen and carbon monoxide while the reaction mixture is maintained at reaction temperature. Alternatively, the process is conducted in a continuous manner as by contacting the reactants and catalyst during passage through a reactor which is typically tubular in form. For best results the process is conducted under conditions of elevated temperature and pressure. Reaction temperatures from about 60° C. to about 250° C. are satisfactory with the temperature range from about 100° C. to about 200° C. being preferred. In one method of effecting reaction, the reactants and catalyst are initially contacted at a comparatively low reaction temperature, e.g., from about 100° C. to about 160° C., and the temperature is raised either gradually or in stages during the course of the reaction. It is also useful, however, to conduct the reaction at or about a constant reaction temperature. The reaction pressure is desirably in the range of from about 600 p.s.i. to about 10,000 p.s.i., preferably from about 1000 p.s.i. to about 3000 p.s.i. In one modification of the process, inert diluent is present, e.g., inert gaseous diluents such as argon, helium, methane, nitrogen and the like, in which case the reaction pressure is properly considered to be the sum of the partial pressures of the materials other than diluent. In the preferred modification of the process, however, the reaction is conducted in the substantial absence of added diluent.

The course of the reaction is easily followed as by observing the pressure decrease within the reactor or by periodic withdrawal and analysis of samples from the reaction system. At the conclusion of reaction, the product mixture is separated by conventional methods such as selective extraction, fractional distillation, decantation, selective crystallization and the like. The unreacted starting material as well as the catalyst and reaction solvent are suitably recycled for further reaction.

The process of the invention results in the formation of 1,3-glycols and β-hydroxyaldehydes of one more carbon atom than the epoxide reactant. Also observed are acetals of the glycol and the hydroxyaldehyde products. Illustrative products include trimethylene glycol and β-hydroxypropionaldehyde produced from ethylene oxide; 1,3-butanediol and β-hydroxybutyraldehyde produced from propylene oxide, 2-hydroxymethylcyclohexanol and 2-hydroxycyclohexanecarboxaldehyde produced from cyclohexane oxide, and other illustrative products such as 1,3-tetradecanediol, 3-formyl-4-hydroxynonane, 2-hydroxymethyl-3,4-dimethylcyclopentanol, 3-methyl-1,3-butanediol and 3-hydroxyhexanal. The products are useful as chemical intermediates, particularly in the formation of polyethers and polyesters, polyurethanes, polyoxyalkylene glycols and the like. The relative proportion of glycol in the product mixture is improved by catalytic hydrogenation of the product mixture or the hydroxyaldehyde component thereof, or alternatively the hydroxyaldehydes are useful as intermediates in the formation of acetals, carboxylic acids, amines and the like.

To further illustrate the improved process of the invention, the following examples are provided. It should be understood that the details thereof are not to be regarded as limitations, as they may be varied as will be understood by one skilled in this art.

EXAMPLE I

A series of experiments was conducted wherein the hydroformylation of ethylene oxide was conducted by charging to a reactor 3 g. of ethylene oxide, 5 g. of various phosphine-modified cobalt carbonyl complexes (unless otherwise indicated) and 35–40 ml. of reaction solvent. The mixture was maintained at reaction temperature and the reactor was pressurized with a 2:1 molar mixture of hydrogen and carbon monoxide to 1200–1500 p.s.i.g. At the end of reaction, the product mixture was separated by extraction with water, the organic phase was washed with water and the combined aqueous solutions were analyzed by gas-liquid chromatographic methods to determine the yields of trimethylene glycol, β-hydroxypropionaldehyde and/or the trimethylene glycolacetal of β-hydroxypropionaldehyde. The results of this series are shown in Table I wherein the term "total product" refers to the sum of all hydroformylation product and the term "glycol" refers to trimethylene glycol.

TABLE I

| Catalyst | Solvent, g. | Temp., ° C. | Yield total product | Yield glycol, percent |
| --- | --- | --- | --- | --- |
| $[(C_4H_9)_3P]_2Co_2(CO)_6$ | Diethyl ether | 125–180 | 92 | 92 |
| $[(C_6H_5)_2PC_2H_5]_2Co_2(CO)_6$ | 50%-diethyl ether-50% benzene | 120–180 | 73 | 73 |
| $Co_2(CO)_8$ plus $(C_6H_5)_2P\text{-}CH_2CH_2\text{-}P(C_6H_5)_2$ | Diethyl ether | 140–185 | 63 | 61 |
| $Co_2(CO)_8$ plus 9-phenyl-9-phosphabicyclo (4.2.1)-nonane, 2.3 g. | do | 100–170 | 68 | 42 |

EXAMPLE II

By procedures similar to that of Example I, experiments were conducted wherein 3 g. of ethylene oxide in various solvents was contacted with a 2:1 molar mixture of hydrogen and carbon monoxide in the presence of 5 g. of bis(tributylphosphine)dicobalt hexacarbonyl and 0.1 ml. of added tributylphosphine. The results of these experiments are shown in Table II wherein the column headings have the same significance as those of Table I.

TABLE II

| Solvent | Temp., ° C. | Pressure, p.s.i.g. | Yield total product, percent | Yield glycol, percent | Yield β-hydroxypropionaldehyde, percent |
| --- | --- | --- | --- | --- | --- |
| Diethyl ether | 125–180 | 1,200–1,500 | 92 | 91 | 0 |
| Diisopropyl ether | 125–190 | 1,200–1,500 | 67 | 63 | 3 |
| Di-n-butyl ether | 125–185 | 1,200–1,500 | 49 | 46 | 0 |
| Tetrahydrofuran | 135–180 | 1,200–1,500 | 62 | 58 | 1 |
| Methyl isobutyl ketone | 130–180 | 1,200–1,500 | 33 | 25.5 | 0 |
| Dimethyl phthalate | 128–185 | 1,200–1,500 | 33 | 22 | 0 |
| Ethyl acetate | 130–180 | 1,200–1,500 | 74 | 73 | 0 |

In a similar experiment employing benzene as solvent and bis(ethyldiphenylphosphine)dicobalt hexacarbonyl as catalyst, a total product yield of 56% was observed; the yield of tri-methylene glycol was 54%.

EXAMPLE III

By procedures similar to that of Example I, hydroformylation of various other epoxide reactants was effected in 40 ml. of diethyl ether solvent in the presence of bis

TABLE III

| Epoxide, g. | Temp., °C Initial | Temp., °C Final | Weight catalyst, g. | Yield of glycol, percent | Principal product(s) |
| --- | --- | --- | --- | --- | --- |
| Ethylene oxide, 4.0 | 120 | 180 | 5.0 | 80–82 | Trimethylene glycol. |
| Propylene oxide, 4.0 | 160 | 180 | 5.0 | 75 | 1,3-butanediol. |
| Isobutylene oxide, 3.0 | 180 | 185 | 3.0 | 77 | 1,3-dihydroxy-3-methylbutane. |
| 1,2-epoxy-4-methylpentene, 6.8 | 160 | 180 | 3.0 | 35 | 1,3-dihydroxy-5-methylhexane. |
| 1,2- and 2,3-epoxyoctane, 8.75 | 175 | 185 | 3.0 | 57 | Nonanediols. |
| Cyclohexene oxide, 6.7 | 168 | 185 | 5.0 | 55 | 2-hydroxymethylcyclohexanol. |

(tributylphosphine)dicobalt hexacarbonyl catalyst and 0.06-0.1 ml. of tributylphosphine. A molar ratio of hydrogen to carbon monoxide of 2:1 was employed and the reaction pressure was 1200-1500 p.s.i.g. The results of this series are shown in Table III (above).

We claim as our invention:

1. The process of producing trimethylene glycol and β-hydroxypropionaldehyde by intimately contacting,
   (a) ethylene oxide,
   (b) tertiary phosphine-modified cobalt carbonyl catalyst, said phosphine being hydrocarbon tertiary mono- to di-phosphine wherein at least one substituent of each phosphorus is aliphatic,
   (c) carbone monoxide, and
   (d) hydrogen, the molar ratio of carbon monoxide to hydrogen being from about 4:1 to about 1:6,
in liquid-phase solution in a substantially anhydrous inert non-hydroxylic reaction solvent consisting essentially of a saturated aliphatic ether of up to 10 carbon atoms and up to 4 ether oxygen atoms having no atoms other than atoms of carbon, hydrogen and oxygen, at a temperature of from 60° C. to about 250° C. and a pressure of from about 600 p.s.i. to about 10,000 p.s.i.

2. The process of claim 1 wherein the tertiary phosphine-modified cobalt carbonyl catalyst is represented by the formula

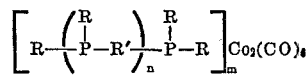

wherein R independently is hydrocarbon of up to 20 carbon atoms free from aliphatic unsaturation, R' is divalent, saturated hydrocarbon aliphatic of from 2 to 3 carbon atoms, $n$ is a whole number from 0 to 1 inclusive, the sum of $m+n$ equals 2 and at least one substituent of each phosphorus is aliphatic, with the proviso that when $n$ is 0, two R together may form a divalent hydrocarbon moiety of up to 12 carbon atoms.

3. The process of claim 2 wherein the catalyst is represented by the formula

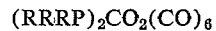

wherein R independently is hydrocarbon of up to 12 carbon atoms free from aliphatic unsaturation and at least one substituent of each phosphorus is aliphatic.

4. The process of claim 3 wherein R independently is straight-chain primary alkyl of up to 12 carbon atoms and the inert reaction solvent is dialkyl ether of from 4 to 8 carbon atoms.

5. The process of claim 4 wherein the catalyst is bis-(tributylphosphine)dicobalt hexacarbonyl and the dialkyl ether is diethyl ether.

6. The process of claim 2 wherein the catalyst is represented by the formula

wherein R independently is hydrocarbon of up to 12 carbon atoms free from aliphatic unsaturation and R' is a divalent saturated hydrocarbon aliphatic moiety of from 2 to 3 carbon atoms.

7. The process of claim 6 wherein the reaction solvent is dialkyl ether of 4 to 8 carbon atoms.

8. The process of claim 7 wherein R is phenyl, R' has 2 carbon atoms and the dialkyl ether is diethyl ether.

References Cited

UNITED STATES PATENTS

| | | | |
|---|---|---|---|
| 3,130,233 | 4/1964 | Niederhauser | 260—602 XR |
| 3,102,899 | 9/1966 | Cannell | 260—430 |
| 2,820,059 | 1/1958 | Hasek et al. | 260—604 |

OTHER REFERENCES

Takegami et al., Bulletin Chem. Soc. (Japan), vol. 337, July 1964, pp. 935–940.

LEON ZITVER, Primary Examiner

R. H. LILES, Assistant Examiner

U.S. Cl. X.R.
260—635.